Mar. 5, 1929.
C. C. FARMER
1,703,875
ANGLE COCK
Filed Oct. 3, 1927
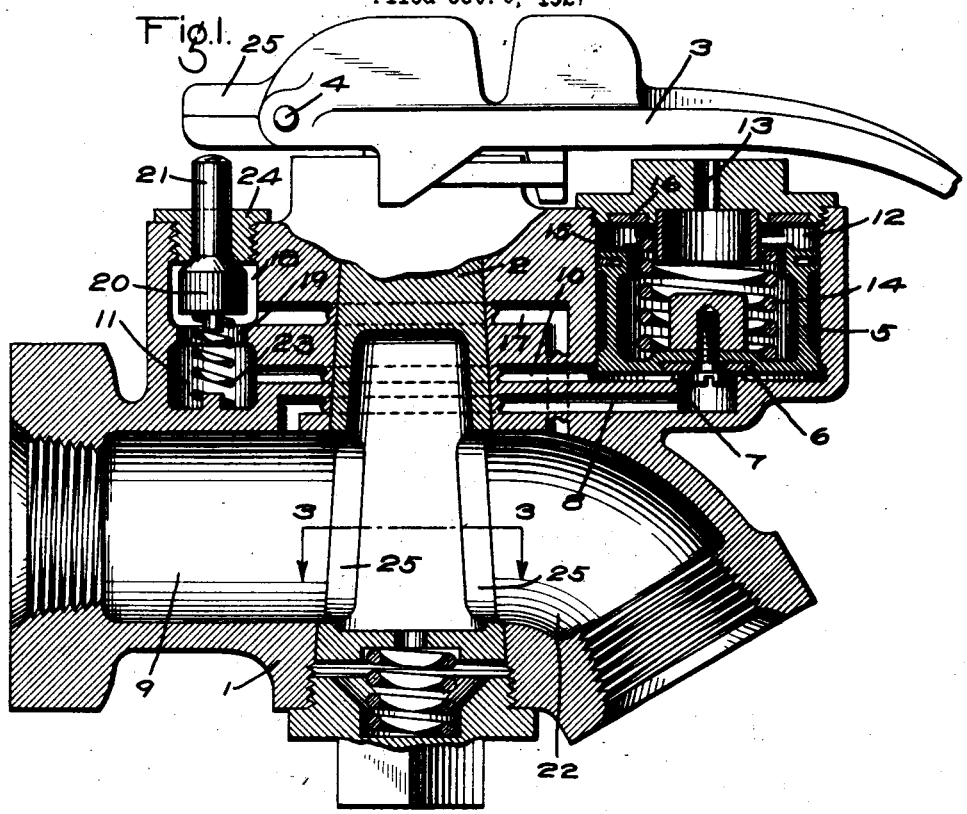
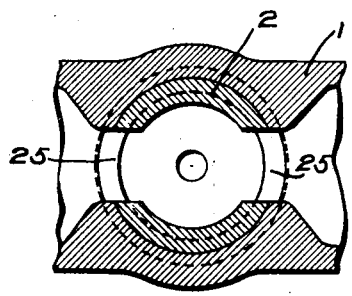
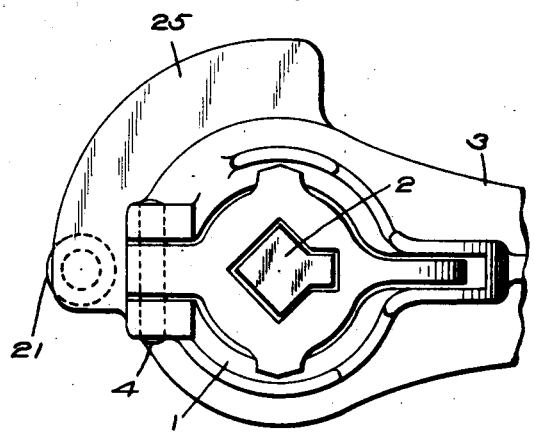
INVENTOR
CLYDE C. FARMER
BY Wm. M. Cady
ATTORNEY Patented Mar. 5, 1929.

1,703,875

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE COCK.

Application filed October 3, 1927. Serial No. 223,534.

This invention relates to angle cocks for railway air brake systems and more particularly to a type in which a by-pass is provided around the angle cock valve for maintaining an open communication around the valve even when the angle cock is in closed position, means being provided to close the by-pass when the hose is uncoupled and the brake pipe is disconnected between the cars.

The purpose of the by-pass is to prevent accidents due to the failure of the air brakes caused by the inadvertent or malicious closing of an angle cock.

With the above mentioned by-pass type of angle cock, when a car having the brake pipe charged with fluid under pressure is connected to a car which is not charged, and the angle cock is turned to its open position, fluid under pressure will be vented from the charged brake pipe to the empty brake pipe on the other car, causing a sudden reduction in brake pipe pressure on the charged car and thereby an emergency application of the brakes.

The principal object of my invention is to provide a by-pass angle cock device having means for preventing a sudden reduction in pressure in the brake pipe under the above conditions.

In the accompanying drawing; Fig. 1 is a sectional view of an angle cock device embodying my invention; Fig. 2 a partial plan view of the angle cock device; and Fig. 3 a section on the line 3—3 of Fig. 1.

As shown in the drawing, the angle cock device may comprise a cock body 1, a cock key 2, and an operating handle 3. In a preferred form of my invention, the well known locking handle is utilized in connection with my improvement, and consequently the handle shown in the drawing is of the locking type adapted to be moved vertically about a pin 4, and also adapted to rotate the cock key in the usual manner.

Disposed in the valve body 1 is a piston 5 having a valve portion 6 at one side adapted to engage a seat rib 7. The valve portion 6 controls communication from a passage 8 leading to the conduit 9 at one side of the key 2, to a passage 10, leading to a chamber 11. The chamber 12 at the outer side of piston 5 is open to an atmospheric port 13 and contains a coil spring 14 which urges the valve portion 6 to its seat. Piston 5 is also provided with a seat rib 15 adapted to engage a seat 16, so that when the piston is moved to its seat 16, chamber 12 is sealed from the exhaust port 13.

A passage 17 connects the conduit 22 at the hose end of the angle cock with a chamber 18, which communicates with chamber 11 through an annular opening 19. A plunger 20 provided with a stem 21 is disposed so that it can be shifted into the opening 19 and the diameter of the plunger 20 is slightly less than that of the opening 19, so as to provide a restricted communication from chamber 11 to chamber 18 when the plunger is moved into said opening.

A spring 23 urges the plunger 20 away from the opening 19 and the stem 21 extends out through an opening in a screw plug 24. A lug 25 is provided on the handle 3 in such a position as to engage the end of the stem 21, when the handle 3 is lifted and is adapted to engage the stem in either the open or closed position of the handle, or in any intermediate position.

When cars are connected with the hose coupled, the angle cock open, and the brake pipe charged with the usual pressure, piston 5 is subjected to fluid under pressure supplied from the conduit 22 at the hose end of the angle cock through passage 17, chamber 18, opening 19, chamber 11 and passage 10. This pressure readily overcomes the pressure of spring 14, so that the piston 5 is moved upwardly, causing the valve 6 to lift from its seat 7, so that communication is established around the cock 2 from conduit 9 to conduit 22. If one or more angle cocks should become closed, either accidently or maliciously, it will be evident that the by-pass will remain open, so that fluid under pressure can flow freely in either direction around the closed angle cock and consequently the operation of the brakes will not be interfered with.

If a car having a charged brake pipe is to be connected to a car which is not charged, the handle 3 is first lifted to release the usual locking lugs and then the handle is slightly rotated so as to turn the cock 2 an amount sufficient to permit a slight flow of fluid from conduit 9 to conduit 22 through the waterways 26, but not at a rate of flow such as would cause an emergency rate of reduction in brake pipe pressure.

When the handle 3 is lifted, the lug 25 engages the stem 21 and moves same so as to cause the plunger 20 to enter into the opening 19. This restricts communication between passages 10 and 17, so that when the piston 5 is moved upwardly by the pressure of fluid supplied to the conduit 22 through the slight opening of the waterways 26, and by way of passage 17, opening 19, and passage 10, while the valve 6 is opened, the flow of fluid from conduit 9 to conduit 22 will still be restricted, since the plunger 20 is disposed in the opening 19, so as to limit the flow of fluid therethrough.

After the fluid pressure has equalized on opposite sides of the cock 2, the handle 3 may be further rotated, so as to shift the valve 2 to its fully open position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a cock having a by-pass passage for establishing communication from one side to the other and means for temporarily restricting communication through said passage.

2. An angle cock device comprising a cock having a by-pass passage for establishing communication from one side to the other and manually operable means for restricting communication through said passage.

3. An angle cock device comprising a brake pipe cock having a by-pass passage for establishing communication from one side to the other, a valve for controlling said passage, a piston exposed on one side to brake pipe pressure at the hose side of the cock, and manually operable means for at will restricting communication through said passage.

4. An angle cock device comprising a brake pipe cock having a by-pass passage for establishing communication from one side to the other, a handle for operating said cock, and means operable by said handle for restricting communication through said passage.

5. An angle cock device comprising a brake pipe cock having a by-pass passage for establishing communication from one side to the other, a pivoted handle for operating said cock, and means operable by the pivotal movement of said handle for restricting communication through said passage.

6. An angle cock device comprising a brake pipe cock having a by-pass passage for establishing communication from one side to the other, a pivoted handle for operating said cock, an opening establishing communication through said passage, and a plunger operated by pivotal movement of said handle for engaging in said opening, to restrict communication through said passage.

7. The method of operating an angle cock having a brake pipe cock and a by-pass passage establishing communication from one side of the cock to the other which consists in moving the cock from its closed position to permit a restricted flow through the cock from one side to the other and in operating means for restricting the flow through the by-pass passage until the fluid pressure on opposite sides of the cock have substantially equalized and finally moving the cock to its fully open position.

In testimony whereof I have hereunto set my hand.

CLYDE C. FARMER